United States Patent [19]

Buchanan et al.

[11] 3,714,087
[45] Jan. 30, 1973

[54] POWDERED RESORCINOL-FORMALDEHYDE TREATED POLYSACCHARIDE-REINFORCED ELASTOMER MASTERBATCHES, COMPOUNDS, AND RESULTING VULCANIZED RUBBERS

[75] Inventors: Russell A. Buchanan; Charles R. Russell, both of Peoria, Ill.

[73] Assignee: The United States of America as represented by the Secretary of Agriculture

[22] Filed: Feb. 28, 1972

[21] Appl. No.: 230,098

Related U.S. Application Data

[62] Division of Ser. No. 58,187, July 24, 1970, Pat. No. 3,673,136.

[52] U.S. Cl. ................................260/17.2, 260/749
[51] Int. Cl. ............................C08c 9/12, C08f 45/14
[58] Field of Search............................................260/17.2

[56] References Cited

UNITED STATES PATENTS 3,673,136   6/1972   Buchanan......................260/17.4 BB

*Primary Examiner*—William H. Short
*Assistant Examiner*—Edward Woodberry
*Attorney*—R. Hoffman et al.

[57] ABSTRACT

Powdered elastomer masterbatches are prepared by grinding dried rubber curds which contain highly effective reinforcing agents. Such finely comminuted elastomer masterbatches provide stable powdered rubber compounds when blended with usual powdered curatives and fine particle fillers. These powdered rubber compounds are formed into finished vulcanized rubber articles by direct heat-compression molding, by extrusion from a simple machine, or by injection molding without prior high shear mixing.

6 Claims, No Drawings

POWDERED RESORCINOL-FORMALDEHYDE TREATED POLYSACCHARIDE-REINFORCED ELASTOMER MASTERBATCHES, COMPOUNDS, AND RESULTING VULCANIZED RUBBERS

This is a division, of application Ser. No. 58,187 filed July 24, 1970 now U.S. Pat. No. 3,673,136.

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to processes for producing powdered elastomer compositions. The invention more specifically relates to powdered elastomer compositions from which vulcanized rubber can be directly prepared. A particular aspect of the invention concerns extensions of and improvements over the inventions described by Buchanan et al., U.S. Pat. Nos. 3,442,832, 3,480,572, and commonly assigned copending application Ser. No. 859,195, filed Sept. 18, 1969, of Stephens et al., which disclosures are incorporated herein by reference.

The instant invention provides the first example of potentially low-cost, storage-stable, general-purpose, powdered rubber compounds suitable for a wide range of applications. It is well known that availability of general-purpose elastomer compounds in powdered form has the possibility of revolutionizing the rubber industry by eliminating the need for costly high shear mixing and the consequent need for heavy duty mixing equipment typified by Banbury mixers. It is desirable to have powdered elastomers such that powder processing techniques common to the plastics industry can be employed in manufacture of rubber goods.

Finely divided elastomers have been prepared by spray drying of latex mixtures, but this method is inherently high in cost and has many other attendant difficulties as discussed by Hedberg et al., U.S. Pat. No. 3,194,781. Also, powdered elastomers have been prepared by co-coagulation with water glass as disclosed by Maass et al., U.S. Pat. Nos. 3,190,851 and 3,257,350; but this method is also impractically expensive besides giving products of limited application because of the high silica loading (50 parts per 100 parts elastomer, phr). Certain other methods for preparation of powdered elastomers have been suggested or attempted; for example, making a 1 percent solution of elastomer, then cooling the solution below the glass transition temperature of the elastomer before coagulation. However, all such methods involving very low temperatures and/or high dilutions are also economically prohibitive.

What has been needed is a low-cost, high-production-rate process for comminuting elastomers to fine particle size. But it is well known that direct grinding of ordinary elastomer crumb or slab is impractical because the heat generated causes it to become extremely tacky and it sticks to internal mill parts, clogging the machine as well as causing excessive power consumption. Elastomers have been ground or pelletized to coarse powders (ca. ⅛-inch particle diameters) by admixture of undesirable and expensive detackifying agents such as polystyrene dust. Elastomers might also be ground under extreme conditions at dry ice temperatures below the polymer brittle point. However, all prior art comminuted elastomers reagglomerate or more usually adhere to form a single mass upon storage. So also do most of the powders formed by spray drying or co-coagulation methods.

In the United States, one powdered specialty elastomer has recently become available, a nitrile at a high premium price as compared to the same slab elastomer. The price premium on this powdered nitrile attests to both the difficulty of production and the utility of powdered elastomers. Despite widespread interest, free-flowing, general-purpose, powdered elastomers remain unavailable because no practical method for their preparation existed prior to our invention.

In the patents of Buchanan et al., supra, it was disclosed that polysaccharide-elastomer coprecipitates are obtained by simultaneously crosslinking polysaccharide and destabilizing latex particles in mixtures of polysaccharide solutions and latices. The polysaccharide-elastomer coprecipitates are oven dried to provide hard-curd particles in which the dry polysaccharide constitutes the continuous phase and elastomer particles the discontinuous phase. In the Buchanan patents it was disclosed that extensive high shear mixing as on a differential roll mill or equivalent machine was required to produce phase inversion and give useful rubber products with a fine particle dispersion of polysaccharide in elastomer matrix. In the copending application Ser. No. 859,195, it was further disclosed that hot mechanical working in a closed machine with moisture present during the phase inversion is advantageous. This phase inversion is obviously a critical step in the process of producing polysaccharide-reinforced rubbers since such composite materials must have an elastomeric matrix in order to have high elastic properties or "rubbery" character. Furthermore, reinforcement of elastomers requires the good dispersion of hard, fine particle filler achieved by breaking up the original polysaccharide matrix during the phase inversion.

A primary object of the invention is to provide powdered rubber compounds suitable for direct heat-compression or injection molding to give finished, vulcanized rubber products, thus making the powder processing techniques long employed by the plastics manufacturing industry available to rubber processors for the first time.

Another object of the invention is to provide powdered elastomer masterbatches suitable for direct blending with curatives and other ingredients to provide completely and thoroughly mixed compounds ready for molding and vulcanizing, thereby completely eliminating or greatly reducing the need to employ expensive, conventional high shear rubber mixing equipment and processes.

Another object of the invention is to provide a method for producing general-purpose elastomer powders by a low-cost, high-production-rate, direct grinding process.

In accordance with the above-stated objects, we have discovered a method for making powdered polysaccharide-reinforced elastomer masterbatches. The method comprises coprecipitating polysaccharides with elastomers, drying the coprecipitates, and comminuting the coprecipitates. The polysaccharide can be any one of the following: starch xanthide, zinc starch xanthate, resorcinol-formaldehyde-treated zinc starch xanthate, lignin and starch xanthide in combination, resorcinol-formaldehyde-treated gelatinized starch, and their cereal flour analogs. Elastomers can be styrene-butadiene rubber, oil-extended styrene-butadiene rubber, nitrile rubber, and phenol-formaldehyde resin-extended nitrile rubber.

Storage-stable, readily curable, powdered polysaccharide-reinforced rubber compounds can be made by blending powdered polysaccharide-reinforced elastomer masterbatches with normally used rubber curatives (i.e., those used in industry such as zinc oxide, sulfur, antioxidant powder, etc.). Besides the curatives, fillers and extenders such as clay, highly reinforcing silica, or carbon black can be incorporated in the rubber compounds.

We have also discovered a method for making vulcanized rubber by direct shaping, molding, and curing of powdered polysaccharide-reinforced rubber compounds with very little prior shear mixing. The shaping and molding are accomplished by the combined action of heat and compression on the powder.

DETAILED DESCRIPTION OF THE INVENTION

We found that the critical phase inversion in polysaccharide-rubber coprecipitates may be made to occur by a process of grinding followed by a heat compression or other molding step in which only very little or no flow of elastomer occurs. Rubber articles equivalent to products obtained by practicing the inventions of the BUchanan patents may be made by fine grinding dried polysaccharide-elastomer curd and then molding the resulting powder. Such articles are fully satisfactory for a large variety of applications. This accomplishment seems at first to be completely contradictory and opposed to all our earlier teaching that high shear mixing and mechanical working to bring about extensive flow of elastomer matrix is necessary to produce phase inversion as needed for rubbery properties. However, having made the unexpected discovery of the present invention, we now reason that grinding of the dry polysaccharide-rubber curd produces incipient phase inversion by breaking up the continuous polysaccharide phase to fine particle size in combination with a very limited hot-flow which may occur during impact in conventional comminuting apparatus. Then the phase inversion process must become completed as a result of the further very limited flow occurring in the heat-compression or other molding process. The above explanation may not be entirely correct, but, regardless of the mechanism involved, it is now apparent that phase inversion from rubber particles in a polysaccharide matrix to polysaccharide particles in a rubber matrix may conveniently be accomplished by a process involving comminuting dry polysaccharide-rubber coprecipitates followed by heat-compression, extrusion, or injection molding.

We have found that grinding of dry polysaccharide-elastomer coprecipitate is facile and gives free-flowing, fine powders. The resulting powdered masterbatches are easily blended with usual powdered curatives to give storage-stable powdered rubber compounds. These powdered compounds can be directly molded into rubber articles in ordinary heated compression molds. The powders can also be formed into finished rubber articles by extrusion from a simple machine with no prior shear mixing; hence, also by injection molding. When desirable, the powdered polysaccharide-rubber compounds per se can be advantageously shaped into mold blanks or further mixed with additional ingredients on differential rolls, or with extruders before shaping into mold blanks. Thus, much less shear mixing is required than for conventional rubber processing.

For grinding polysaccharide-rubber compositions, any of the common commercial comminuting machines may be employed, i.e., impact mills such as hammer, Wiley, and pin mills, etc. Grinding may include air or screen classification with recycle of coarse fractions to the grinders as conventionally practiced in order to further reduce average particle size. We find it advantageous, but not essential, to incorporate small amounts of anticaking substances into powdered rubber masterbatches. Fine particle fumed or hydrated silicas are preferred because these materials are further useful for their reinforcing ability in the finished rubbers. Generally, we employ up to 10 phr of hydrated silica (PPG Hi-Sil 215) which has been pelletized and is therefore advantageously added during the grinding operation to achieve both disintegration of pellet and distribution throughout the powdered rubber masterbatch. Additional fillers and extenders such as clay, highly reinforcing silica, and carbon black can also be used.

Compounding of polysaccharide-rubber masterbatch powders may be accomplished with V or ribbon blenders if added ingredients are fine powders. If flaked, pelletized, or encapsulated compounding ingredients are added, high-speed rotary blade powder mixers, such as the Waring Blendor or Henschel mixer, are preferred.

This invention may be practiced with any of the polysaccharide-rubber compositions disclosed in the reference U.S. Patent Nos. (3,442,832 and 3,480,572) and copending application Ser. No. 859,195. Accordingly, any elastomer available in latex form may be employed including natural rubber or preferably synthetic elastomers such as nitrile and SBR. Suitable polysaccharides include starches, starch derivatives, cereal flour, and derivatives thereof. Examples of applicable starch products are gelatinized starches, aminated starches, xanthated starches, resin-treated starches, starch xanthides, and similar derivatives as well as their cereal flour analogs, etc. Polysaccharide loading must exceed about 15 phr for easy grinding. There is no upper limit on polysaccharide loading, but the cured products undergo a transition from elastic vulcanized rubbers to rigid thermoset plastics as starch loading increases above about 100 phr. For elastic vulcanized rubbers, we prefer to use relatively low polysaccharide loadings, from 15 to 30 phr, in order to allow more freedom for addition of conventional fillers during compounding, thus increasing the area for application of the powdered elastomer masterbatches. For rigid thermoset plastic applications, we prefer to use relatively high polysaccharide loadings, from 100 to 400 phr, so that the total composition contains not more than about 70 weight percent elastomer plus resin combined.

The following examples are included as further illustrations of the invention but not as limitations thereon.

EXAMPLE 1

The starting materials included type 1502-SBR (styrene-butadiene) latex containing 20.5 percent total solids and a 10 percent aqueous starch xanthate solution with xanthate degree of substitution (D.S.) of 0.11.

For a starch xanthide-SBR-1502 coprecipitate containing 20 phr starch (20 parts starch per 100 parts SBR), a homogeneous mixture was prepared containing 800 g. starch xanthate solution, 1,950 g. SBR-1502 latex, 8 g. of 50 percent styrenated phenol antioxidant emulsion, and 6 g. sodium nitrite. This mixture was stirred for 30 minutes, then 175 ml. of 2 N sulfuric acid were slowly added dropwise with stirring to give a pH of 4.0–4.5 and maintain it for 10 minutes. This treatment coprecipitated starch xanthide and SBR-1502 elastomer as large curd particles. The curds were recovered by filtration, washed once by suspension in water, then dried in a forced draft oven at 70° C. to give 476 g. of dried starch-rubber coprecipitate.

Another starch xanthide-SBR-1502 coprecipitate having 30 phr starch was prepared in the same manner with the same quantities of latex and antioxidant, but using 1,200 g. starch xanthate solution, 7.6 g. sodium nitrite, and 253 ml. of 2 N sulfuric acid. This gave 503 g. of dried starch-rubber coprecipitate.

A third starch xanthide-SRB-1502 coprecipitate having 45 phr starch was also prepared based on the same amount of latex. This product weighed 580 g.

Since the oven-dried curds were too large for the feed screw of our laboratory hammermill, each product was first ground to pass a 3-mesh screen on a small Wiley mill. The coarse ground coprecipitates were then ground through a 16-mesh screen by an ordinary agricultural-type hammermill. Each powder was then mixed with 20 g. of hydrated silica in a Waring Blendor for 30 seconds. Screen analyses of the resulting free-flowing powders gave the following values:

| Masterbatch composition | Particle diameters, % smaller than | | | | |
|---|---|---|---|---|---|
| | 1,410 μ | 840 μ | 590 μ | 420 μ | 350 μ |
| 20 phr starch | 100 | 98.4 | 90.7 | 67.6 | 50.8 |
| 30 phr starch | 100 | 96.5 | 78.3 | 50.1 | 38.3 |
| 45 phr starch | 100 | 98.6 | 93.4 | 80.4 | 70.4 |

Each masterbatch powder was mixed with 1 phr flake stearic acid, 4 phr zinc oxide, 2 phr sulfur, 2 phr antioxidant powder, 1.5 phr benzothiazyl disulfide accelerator, and 0.1 phr tetramethylthiuram disulfide secondary accelerator for 30 seconds at high speed in a Waring Blendor. Each resulting rubber compound was then divided into two equal portions.

One portion of each compound was consolidated into mold blanks suitable for preparing standard ASTM test specimens by passing through a tight nip on a differential roll mill for three passes, then sheeting out to the required thickness with a minimum of further milling. This mold blank forming process required less than one-tenth of the high shear mixing time needed for conventional rubber processing, i.e., as described by ASTM method D15–68a for example. Oscillating disc rheometer cure data were obtained using these mill-formed blanks for each compound, and all vulcanized test specimens were prepared using the rheometer optimum cure time at 150° C.

The other portion of each powdered rubber compound was subdivided, and test specimens were prepared by direct powder molding. A thin flat rubber sheet for tensile specimens was prepared by molding powder directly between flat plats. A small rubber dish was compression molded and cured for examination. Rods, ¼ inch in diameter, were prepared from powder feed by extrusion at 125° C. with a Brabender-Plasticorder equipped with 10/1 length to diameter ratio extrusion head and then post-curing the extrudate in an oven.

Representative physical test data for these various specimen types are given in the following table:

| Starch loading, phr. | Treatment | Cure time, min. | Hardness, Shore A | Tensile strength, p.s.i. | Ultimate elongation, percent | Dish, utility, and appearance |
|---|---|---|---|---|---|---|
| 20 | Mill consolidation | 17 | 70 | 1,560 | 475 | |
| | Powder molding | 17 | | 760 | 220 | Excellent. |
| | Powder extrusion | 17 | | 1,155 | | |
| 30 | Mill consolidation | 17.5 | 77 | 1,110 | 330 | |
| | Powder molding | 17.5 | | 1,050 | 200 | Do. |
| 45 | Mill consolidation | 15.5 | 83 | 1,620 | 260 | |
| | Powder molding | 15.5 | | 1,070 | 130 | Good. |
| | Powder extrusion | 15.5 | | 1,090 | | |

Remaining portions of these powdered starch xanthide-SBR-1502 compounds were stored at room temperature for 10 weeks. At the end of this storage period, they remained free-flowing, and their rheometer cure curves remained unchanged, i.e., completely identical with the initial curves made soon after compounding. Thus, these powders were completely stable to indefinitely long storage.

Although the above physical test data appear to indicate that mill consolidation of the powdered compounds results In better vulcanizate strength than the other treatments, the difference in test values is due in part to inaccuracies associated with testing the nonstandard specimens prepared by the powder-forming processes. The inaccuracies arise because such specimens are hard to clamp properly in our test machine. We believe that the properties of the extruded shapes are actually fully equivalent to those of the mill consolidated specimens. The data clearly show that rubber articles with technically useful and acceptable properties can be prepared by direct molding of this invention's powdered compounds and that these compounds are suitable for direct feeding to screw injection molding machines.

EXAMPLE 2

Latex and starch xanthate starting materials were the same as in Example 1.

For a zinc starch xanthate-SBR-1502 coprecipitate containing 20 phr starch, a homogeneous mixture was prepared containing 800 g. starch xanthate solution, 1,950 g. SBR–1502 latex, and 8 g. of 50 percent styrenated phenol antioxidant emulsion. This mixture was agitated for 30 minutes; then 24 ml. of 2 N sulfuric acid were added dropwise, followed by rapid addition of 198 ml. of M zinc sulfate solution. The resulting coprecipitate was recovered by filtration and dried, without washing, in a forced draft oven at 70° C., giving 487 g. of product.

Other zinc starch xanthate-SBR–1502 products containing 30 phr and 45 phr starch, respectively, were prepared by the same process using increased amounts of starch xanthate solution and acid but the same quantities of other reagents. There were 536 g. and 611 g. of these two products, respectively.

All three samples were ground by the procedure of Example 1 except that the 20 g. of hydrated silica were added before grinding through the hammermill. Their screen analyses were as follows:

| Masterbatch composition | Particle diameters, % smaller than | | | | |
|---|---|---|---|---|---|
| | 1,410 μ | 840 μ | 590 μ | 420 μ | 350 μ |
| 20 phr starch | 100 | 87.5 | 74.3 | 55.7 | 45.7 |
| 30 phr starch | 100 | 96.2 | 86.2 | 65.2 | 50.7 |
| 45 phr starch | 100 | 99.5 | 94.4 | 77.1 | 64.9 |

These masterbatch powders were compounded with a Waring Blendor as in Example 1 except that addition of zinc oxide was not required. Vulcanized test specimens were prepared as in Example 1 and their test values are given below:

| Starch loading, phr. | Treatment | Cure time, min. | Hardness, Shore A | Tensile strength, p.s.i. | Ultimate elongation, percent | Dish, utility, and appearance |
|---|---|---|---|---|---|---|
| 20 | Mill consolidation | 21 | 63 | 1,860 | 720 | Excellent translucent. |
| | Powder molding | 21 | | 1,150 | 570 | |
| | Powder extrusion | 21 | | 1,163 | | |
| 30 | Mill consolidation | 17.5 | 72 | 1,600 | 510 | Do. |
| | Powder molding | 17.5 | | 1,110 | 380 | |
| | Powder extrusion | 17.5 | | 1,800 | | |
| 45 | Mill consolidation | 12 | 83 | 1,320 | 450 | Satisfactory. |
| | Powder molding | 12 | | 710 | 40 | |
| | Powder extrusion | 12 | | 840 | | |

The above data clearly show that zinc starch xanthate-SBR powdered rubber compounds are fully equal or superior to the starch xanthide containing powders. We believe that the compound containing only 20 phr zinc starch xanthate is especially useful because of the strong, very elastic, light-colored, translucent rubber articles which can be directly molded from this powder. Because it has a low starch loading, this powdered compound is very amenable to extension with additional fillers and extenders as well as with additional high-reinforcing agents. Thus, it is a very versatile product with a wide range of applications.

EXAMPLE 3

Four powdered masterbatches were prepared from starting xanthate solutions containing 10 percent of corn flour, soft wheat flour, hard wheat flour, or unmodified corn starch, respectively. These masterbatches contained 30 phr amylaceous material and were made by coprecipitation with zinc according to the procedure of Example 2. However, 3.7 g. of resorcinol and 7.2 g. of 37 percent formalin were added to each xanthate-latex mixture during the 30-minute agitation period preceding the coprecipitation. Sample size was based on 1,950 g. of SBR-1502 latex and dry product weights were 537 g., 541 g., 532 g., and 536 g. for corn flour, soft wheat flour, hard wheat flour, and starch products, respectively. Screen analyses were as follows:

| Masterbatch composition | Particle diameters, % smaller than | | | | |
|---|---|---|---|---|---|
| | 1,410 μ | 840 μ | 590 μ | 420 μ | 350 μ |
| Corn flour | 100 | 97.8 | 85.6 | 59.9 | 46.6 |
| Soft wheat flour | 100 | 96.4 | 84.2 | 63 | 50.9 |
| Hard wheat flour | 100 | 97.2 | 86.9 | 66.1 | 53.9 |
| Starch | 100 | 95.0 | 79.6 | 59.1 | 51.2 |

These powdered masterbatches were compounded without added zinc oxide and vulcanized test specimens were prepared as in Example 2. Representative physical test data are given below:

| Product | Treatment | Cure time, min. | Hardness, Shore A | Abrasion resistance, percent | Tensile strength, p.s.i. | Ultimate, elongation p.s.i. |
|---|---|---|---|---|---|---|
| Corn flour | Mill consolidation | 30 | 74 | 109 | 2,180 | 480 |
| | Powder molding | 30 | | | 1,450 | 320 |
| | Powder extrusion | 30 | | | 1,800 | |
| Soft wheat flour | Mill consolidation | 30 | 76 | 133 | 2,040 | 415 |
| | Powder molding | 30 | | | 1,600 | 310 |
| | Powder extrusion | 30 | | | 2,085 | |
| Hard wheat flour | Mill consolidation | 27 | 77 | 60 | 1,830 | 350 |
| | Powder molding | 27 | | | 1,580 | 350 |
| | Powder extrusion | 27 | | | 2,025 | |
| Starch | Mill consolidation | 30 | 78 | 150 | 2,200 | 400 |
| | Powder molding | 30 | | | 1,510 | 270 |
| | Powder extrusion | 30 | | | 1,800 | |

The above surprisingly good abrasion resistance values were obtained with the DuPont abrader and are relative values. Vulcanizates made form commercial type 1606, 52 phr HAF black reinforced, SBR masterbatch were assigned abrasion resistance value of 100 percent.

Each of the above powdered compounds gave an excellent highly elastic, brown, translucent dish with a polished surface by direct molding from powder.

This example illustrates that a variety of low-cost amylaceous materials can be employed in place of refined starches in practice of the invention. It also shows the marked improvements obtained by treatment of the incorporated polysaccharides with resorcinol-formaldehyde.

EXAMPLE 5

A hot corn flour paste containing 19.96 percent solids was prepared by steam-jet cooking at 340° F. with a Penick and Ford laboratory cooker described in their U.S. Pat. No. 3,133,836. Similarly, a hot unmodified corn starch paste was prepared containing 19.71 percent solids.

Homogeneous mixtures were made immediately from 545 g. of the hot corn flour paste and 572 g. of the hot starch paste, respectively, with added 8 g. of 50 percent sodium hydroxide, 1,950 g. of SBR–1502 latex, 8 g. of 50 percent styrenated phenol antioxidant emulsion, 4.9 g. of resorcinol, and 4.0 g. of paraformaldehyde. Each of these mixtures was stirred 30 minutes then coprecipitated by addition of 185 ml. M zinc sulfate solution. The soft curd products were recovered by filtration and dried in a forced draft oven at 70° C. Dry weights were 527 g. and 519 g. for corn flour resin and starch resin products, respectively. They contained 30 phr of resin-treated amylaceous material wherein 0.06 mole of resorcinol per 162 g. of cereal raw material was incorporated.

These products were ground by the procedure of Example 2 with results as follows:

| Product | Particle diameters, % smaller than | | | | |
|---|---|---|---|---|---|
|  | 1,410 μ | 840 μ | 590 μ | 420 μ | 350 μ |
| Cornflour | 100 | 92.1 | 62.3 | 30.6 | 19.9 |
| Starch | 100 | 84.5 | 58.2 | 34.0 | 24.3 |

They were compounded by mixing with powdered curatives in the Waring Blendor, optimum curing conditions were determined, and vulcanized test specimens were prepared.

3, each powdered compound gave vulcanizates with surprisingly good abrasion resistance. They also gave excellent quality dishes by direct molding from powder.

EXAMPLE 5

Four lignin-containing starch xanthide-SBR–1502 coprecipitates were prepared as described in Example 1 in amounts based on 1,950 g. of the starting latex. The quantities of other reagents were varied to give either 15 or 30 phr starch loading, and purified commercial lignin was added in amounts giving either 13 or 26 phr loading. Identification and composition of these samples follow:

| Sample No. | Starch loading, phr | Lignin loading, phr | Product weight, g. |
|---|---|---|---|
| 78 | 15 | 13 | 535 |
| 80 | 15 | 26 | 595 |
| 12 | 30 | 13 | 596 |
| 81 | 30 | 26 | 699 |

Sample No. 12 was ground by the procedure of Example 1. No hydrated silica was subsequently added even though lignin is somewhat deleterious in its effect on caking of these powders. Sample No. 78 had 5 phr hydrated silica incorporated during grinding as in Example 2. Samples No. 80 and 81 were ground once through the hammermill with added 3 phr hydrated silica then screened on a 30-mesh screen. Then the coarse fraction from samples 80 and 81 was reground through the hammermill with an additional added 2 phr hydrated silica and recombined with its fine fraction. Screen analysis of these powdered masterbatches follow:

| Sample No. | Particle diameters, % smaller than | | | | |
|---|---|---|---|---|---|
|  | 1,410 μ | 840 μ | 590 μ | 420 μ | 350 μ |
| 78 | 100 | 94.7 | 82.0 | 56.2 | 40.7 |
| 80 | 100 | 98 | 94.5 | 80.6 | 62.3 |
| 12 | 100 | 63.3 | 35 | — | 8.4 |
| 81 | 100 | 98.9 | 95.4 | 77.6 | 58.9 |

Vulcanizates made by compounding and curing the above powdered masterbatches had the following properties;

| Product | Treatment | Cure time, min. | Hardness, Shore A | Abrasion resistance, percent | Tensile strength, p.s.i. | Ultimate elongation p.s.i. |
|---|---|---|---|---|---|---|
| Corn flour | Mill consolidation | 30.5 | 59 | 100 | 1,380 | 710 |
|  | Powder molding | 30.5 |  |  | 1,140 | 430 |
|  | Powder extrusion | 30.5 |  |  | 1,010 |  |
| Starch | Mill consolidation | 35 | 67 | 120 | 1,530 | 500 |
|  | Powder molding | 35 |  |  | 1,420 | 370 |
|  | Powder extrusion | 35 |  |  | 1,167 |  |

| Sample No. | Treatment | Cure time, min. | Hardness, Shore A | Tear strength, lb./in. | Tensile strength, p.s.i. | Ultimate elongation percent |
|---|---|---|---|---|---|---|
| 78 | Mill consolidated | 46 | 67 | 253 | 2,340 | 815 |
|  | Powder molded | 46 |  |  | 1,720 | 790 |
|  | Powder extrusion | 46 |  |  | 1,595 |  |
| 80 | Mill consolidated | 23 | 70 | 299 | 2,600 | 660 |
|  | Powder molded | 23 |  |  | 1,980 | 600 |
|  | Powder extrusion | 23 |  |  | 1,505 |  |
| 12 | Mill consolidated | 25 | 90 | 315 | 1,880 | 365 |
|  | Powder molded | 25 |  |  | 1,040 | 200 |
|  | Powder extrusion | 25 |  |  | 1,155 |  |
| 81 | Mill consolidated | 26 | 80 | 293 | 2,400 | 500 |
|  | Powder molded | 26 |  |  | 980 | 290 |
|  | Powder extrusion | 26 |  |  | 1,930 |  |

This example illustrates use of resin crosslinked gelatinized starch as an alternative to starch xanthate derivatives in practice of the invention. Resulting vulcanizates have somewhat different properties than are obtained with xanthate derivatives. But as in Example This example illustrates that the invention can be practiced advantageously with the previously disclosed synergistic starch-lignin reinforcing agents. Each of the above powdered rubber compounds gave high-quality rubber articles by direct molding.

EXAMPLE 6

Starting materials for the preparations described herein include an aqueous 10 percent corn flour xanthate solution with xanthate D.S. 0.04, water-dispersible phenol-formaldehyde resole syrup containing 66.8 percent solids, and Chemigum 236 NBR (nitrile) acrylonitrile-butadiene latex containing 39.9 percent solids.

Sample No. 87 contained 20 phr of resorcinol-formaldehyde-treated zinc corn flour xanthate and no phenol-formaldehyde resin. A homogeneous mixture was prepared from 800 g. of xanthate solution, 1,002 g. of NBR latex, 8 g. of 50 percent antioxidant emulsion, 2.2 g. of resorcinol, and 4.8 g. of 37 percent formalin. The mixture was agitated for 30 minutes, then 15 ml. of 2 N sulfuric acid were added dropwise followed by rapid addition of 198 ml. of M zinc sulfate solution. The coprecipitated curd was recovered by filtration and dried in a forced draft oven at 70° C. giving 507 g. of product.

Sample No. 88 contained 25 phr of resorcinol-formaldehyde-treated zinc corn flour xanthate plus 25 phr of phenol-formaldehyde resin. It was prepared in the same manner as above using the same quantities of latex, antioxidant, and zinc but using 1,000 g. of xanthate, 148 g. of resole syrup, 2.7 g. of resorcinol, 6.1 g. of formalin, and 50 ml. of 2 N acid. The dry product weighed 626 g.

Sample No. 90 contained 100 phr of resorcinol-formaldehyde-treated zinc corn flour xanthate and 100 phr of phenol-formaldehyde resin. It was coprecipitated by the above method using 2,000 g. xanthate, 501 g. NBR latex, 296 g. resole syrup, 5.5 g. resorcinol, 13 g. formalin, 4 g. antioxidant emulsion, 115 ml. of 2 N sulfuric acid, and 198 ml. M zinc sulfate. The dry product weighed 561 g.

Sample No. 91 contained 400 phr of resorcinol-formaldehyde-treated zinc corn flour xanthate and 400 phr phenol-formaldehyde resin. It was made as above using 3,000 g. xanthate, 190 g. NBR latex, 449 g. resole syrup, 2 g. antioxidant emulsion, 8.3 g. resorcinol, 19.5 g. 37 percent formalin, 265 ml. 2 N sulfuric acid, and 198 ml. M zinc sulfate. The dry product weighed 584 g.

Each of these products was ground as in Example 1. Three phr of hydrated silica were added to sample No. 87 during compounding but not to the others. All gave perfectly free-flowing powders as follows:

| Sample No. | Particle diameters, % smaller than | | | | | |
|---|---|---|---|---|---|---|
| | 1,410 μ | 840 μ | 590 μ | 420 μ | 350 | |
| 87 | 100 | 98.5 | 92.3 | 78.6 | 69.1 | |
| 88 | 100 | 98.6 | 93.1 | 82.2 | 75.6 | |
| 90 | 100 | 98.3 | 97.2 | 89.9 | 82.6 | |
| 91 | 100 | 99.3 | 98.1 | 90.0 | 82.9 | |

Samples 87 and 88 were powder blended with rubber curatives, cured, and tested as in previous examples. Their vulcanizate properties are tabulated below:

| Sample No. | Treatment | Cure time, min. | Hardness, Shore A | Tensile strength, p.s.i. | Ultimate elongation, percent | Dish, utility, and appearance |
|---|---|---|---|---|---|---|
| 87 | Mill consolidated | 24.5 | 78 | 1,640 | 360 | Excellent |
| | Powder molded | 24.5 | | 1,400 | 250 | |
| | Powder extrusion | 24.5 | | 1,190 | | |
| 88 | Mill consolidated | 34.0 | 90 | 2,080 | 340 | Do. |
| | Powder molded | 34.0 | | 1,160 | 130 | |
| | Powder extrusion | 34.0 | | 1,210 | | |

Samples 90 and 91 were treated as phenolic resin molding compounds. Sample 90 was blended in a Waring Blendor with 2.0 g. stearic acid, 27.7 g. calcium oxide, 4.0 g. sulfur, 3.0 g. antioxidant, 3.0 g. benzothiazyl disulfide, and 0.2 g. tetramethylthiuram disulfide. Sample 91 was blended with 0.7 g. stearic acid, 26.4 g. calcium oxide, 1.4 g. sulfur, 1.0 g. antioxidant, 1.0 g. benzothiazyl disulfide, and 0.1 g. tetramethylthiuram disulfide. Both these powder compounds were densified by passing through the nip of a steam-heated differential roll mill for five passes. The densified material was removed from he roll with a doctor knife after each pass. The densified powders were then cured 20 minutes at 150° C. in various compression molds. Molded articles were produced including dishes of the type examined in previous examples. These articles were thermoset plastics with hard smooth finish, excellent appearance, good water resistance, and high-impact resistance. Articles made from sample 90 were slightly flexible.

EXAMPLE 7

A free-flowing powdered zinc starch xanthate-oil-extended elastomer masterbatch was prepared by the method of Example 2. It contained 20 parts starch and 10 parts silica per 100 parts oil plus elastomer; the oil to elastomer ratio was 1/2. The masterbatch contained 350 g. of Sunthene 3120 napthenic extender oil and 700 g. of SBR type 1713 elastomer in a total sample weight of 1,366 g. Screen analysis of the powder masterbatch showed that more than 54 percent of its particles were smaller than 350 μ with none larger than 1,410 μ.

The powdered masterbatch was divided into five 260-g. portions and a sixth remaining portion of 66 g. Each portion was compounded with rubber curatives as in previous examples but with additional fillers except samples 92-1 and 92-6 which had no additional fillers. Sample 92-2 had an additional 30 phr of hydrated silica, 92-3 had 52 phr hard clay, 92-4 had 18 phr ASTM reference black No. 2 (HAF), 92-5 had 36 phr of the No. 2 reference black, and 92-6 was the 66-g. portion of masterbatch compounded exactly as 92-1 for comparative powder molding. The first five of these compounds were mill consolidated into mold blanks, cured, and test specimens prepared. Vulcanizate properties follow.

| Sample No. | Specific gravity | Hardness, Shore A | Tear strength, lb./in. | 300% modulus, p.s.i. | Tensile strength, p.s.i. | Ultimate elongation, percent |
|---|---|---|---|---|---|---|
| 92-1 | 1.085 | 49 | 149 | 480 | 1,080 | 700 |
| 92-2 | 1.185 | 68 | 221 | 660 | 1,730 | 750 |
| 92-3 | 1.289 | 63 | 204 | 650 | 1,580 | 780 |
| 92-4 | 1.141 | 60 | 201 | 920 | 1,800 | 560 |
| 92-5 | 1.186 | 70 | 230 | 1,360 | 2,130 | 480 |
| 92-6 | | | | | 600 | 250 |

It is evident from he foregoing data that this invention provides even highly oil-extended, general-purpose elastomer powders entirely suitable for compounding with high loadings of a variety of additional reinforcing agents, fillers, and extenders.

We claim:

1. Powdered resorcinol-formaldehyde-treated zinc cereal xanthate-SBR elastomer masterbatches containing about 30 phr of a material selected from the group consisting of refined starch and cereal flours, having nearly all particles below 1,410 $\mu$ diameter and more than 46 weight percent below 350 $\mu$ diameter, and which provide vulcanized rubbers having greater than about 1,450 p.s.i. tensile strength, greater than about 74 Shore A hardness, and greater than about 270 percent ultimate elongation.

2. Powdered resorcinol-formaldehyde-treated gelatinized cereal product-SBR elastomer masterbatches containing about 30 phr of a material selected from the group consisting of refined starch and cereal flour, having nearly all particles below 1,410 $\mu$ diameter and more than 58 weight percent below 590 $\mu$ diameter, and which provide vulcanized rubbers having greater than about 1,010 p.s.i. tensile strength, greater than about 59 Shore A hardness, and greater than about 370 percent ultimate elongation.

3. Powdered resorcinol-formaldehyde-treated zinc corn flour xanthate-NBR elastomer masterbatches containing from 20 to 400 phr corn flour and from 0 to 400 phr of phenol-formaldehyde extender resin, having nearly all particles below 1,410 $\mu$ diameter and more than 69 weight percent below 350 $\mu$ diameter, and which provide vulcanized rubbers having greater than about 1,160 p.s.i. tensile strength, greater than about 78 Shore A hardness, and greater than about 130 percent ultimate elongation.

4. Reinforced vulcanized rubber prepared from powdered resorcinol-formaldehyde-treated zinc cereal xanthate-SBR elastomer masterbatches described in claim 1 blended with normally used rubber curatives, and that has greater than about 1,450 p.s.i. tensile strength, greater than about 74 Shore A hardness, and greater than about 270 percent ultimate elongation.

5. Reinforced vulcanized rubber prepared from powdered resorcinol-formaldehyde-treated gelatinized cereal product-SBR elastomer masterbatches described in claim 2 blended with normally used rubber curatives, and that has greater than about 1,010 p.s.i. tensile strength, greater than about 59 Shore A hardness, and greater than about 370 percent ultimate elongation.

6. Reinforced vulcanized rubber prepared from powdered resorcinol-formaldehyde-treated zinc corn flour xanthate-NBR elastomer masterbatches described in claim 3 blended with normally used rubber curatives, and that has greater than about 1,160 p.s.i. tensile strength, greater than about 78 Shore A hardness, and greater than about 130 percent ultimate elongation.

* * * * *